United States Patent Office 3,290,220
Patented Dec. 6, 1966

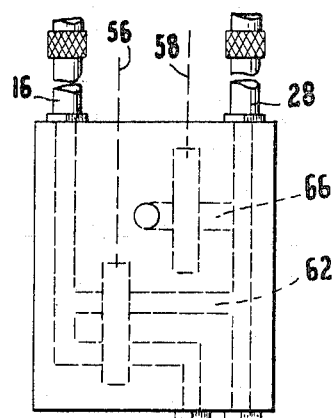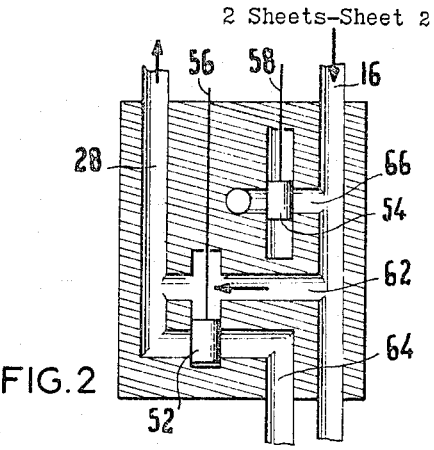
FIG.2
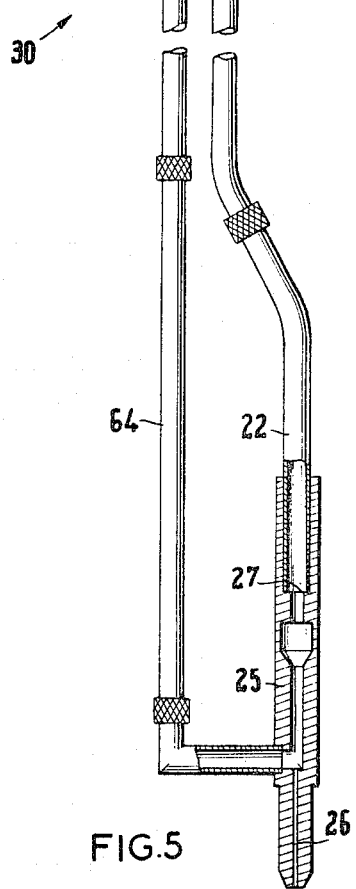
FIG.5
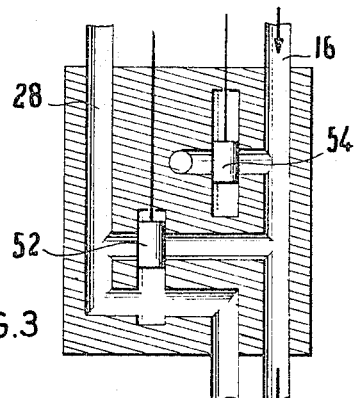
FIG.3
FIG.4

3,290,220
FACILITY FOR THE HYDRAULIC TRANSFER OF IRRADIATION CONTAINERS
Gerard Mitault, Grenoble, and Jean Puychevrier, Wissous, France, assignors to Commissariat a l'Energie Atomique, Paris, France
Filed June 8, 1964, Ser. No. 373,474
Claims priority, application France, June 20, 1963, 938,833
4 Claims. (Cl. 176—15)

The invention relates to hydraulic transfer facilities and has for its object a facility for transferring irradiated irradiation containers between an irradiation station located within a body of water, for example the water of a nuclear reactor of the swimming-pool type, and a charge and discharge station located outside the pool or tank.

Facilities have already been designed and built for the purpose of conveying irradiated irradiation containers between a number of stations by means of a hydraulic system fitted with reversing valves. Facilities of this type offer the advantages of effecting the cooling of the irradiation containers during transfer and avoiding all handling operations by means of grappling devices which would cause damage to the fuel elements. The direct transposition of such facilities to the case of transportation of irradiation containers must, however, be avoided inasmuch as it entails the need to deliver into a circulating system which is located outside the pool water which has been activated as a result of its passage through the irradiation station located in proximity to the reactor core or even within this latter. In point of fact, the closed cycle which was provided by systems of the prior art entails a simultaneous displacement of the irradiation containers and of all the water contained in the system.

The present invention is directed to the design of an installation which permits the possibility of avoiding the passage of activated water into that portion of the circulating system which is located outside the reactor tank while transfer operations are in progress.

To this end, the invention proposes a facility for the hydraulic transfer of irradiation containers between an irradiation station located within a body of water, for example the water of a nuclear reactor of the swimming-pool type, and a charge and discharge station which is located externally of said body of water, characterized in that said installation comprises a transit tube for transferring irradiation containers and connecting the charge station to a first extremity of the irradiation station, a circulating tube which is permanently connected to the charge station, a distributor comprising means for providing a communication between said first extremity of the irradiation station and the body of water or for isolating said first extremity from said body of water and for connecting the circulating tube either to one or the other extremity of the irradiation station, a circulating pump for the purpose of causing the water to circulate either in one direction or the other within the circulating tube and a compensating tank which serves to supply the tubes with a quantity of purified water which corresponds to the quantity delivered from the body of water through the distributor into the transit tube.

The arrangement according to the invention is especially applicable to an irradiation station disposed within the core of a pool reactor or in proximity to said core and, under normal operating conditions, employs the core cooling system for the purpose of producing via the irradiation station a suction of water for the removal of heat dissipated by the irradiation containers, but this application is not intended to have any limitative character.

A better understanding of the invention will be had by consideration of the following description of one form of embodiment which is given by way of example without implied limitation. The description relates to the accompanying drawings wherein:

FIGS. 2, 3 and 4 show diagrammatically the distributor of the hydraulic facility of FIG. 1 in the positions which correspond respectively.

Figure 1:
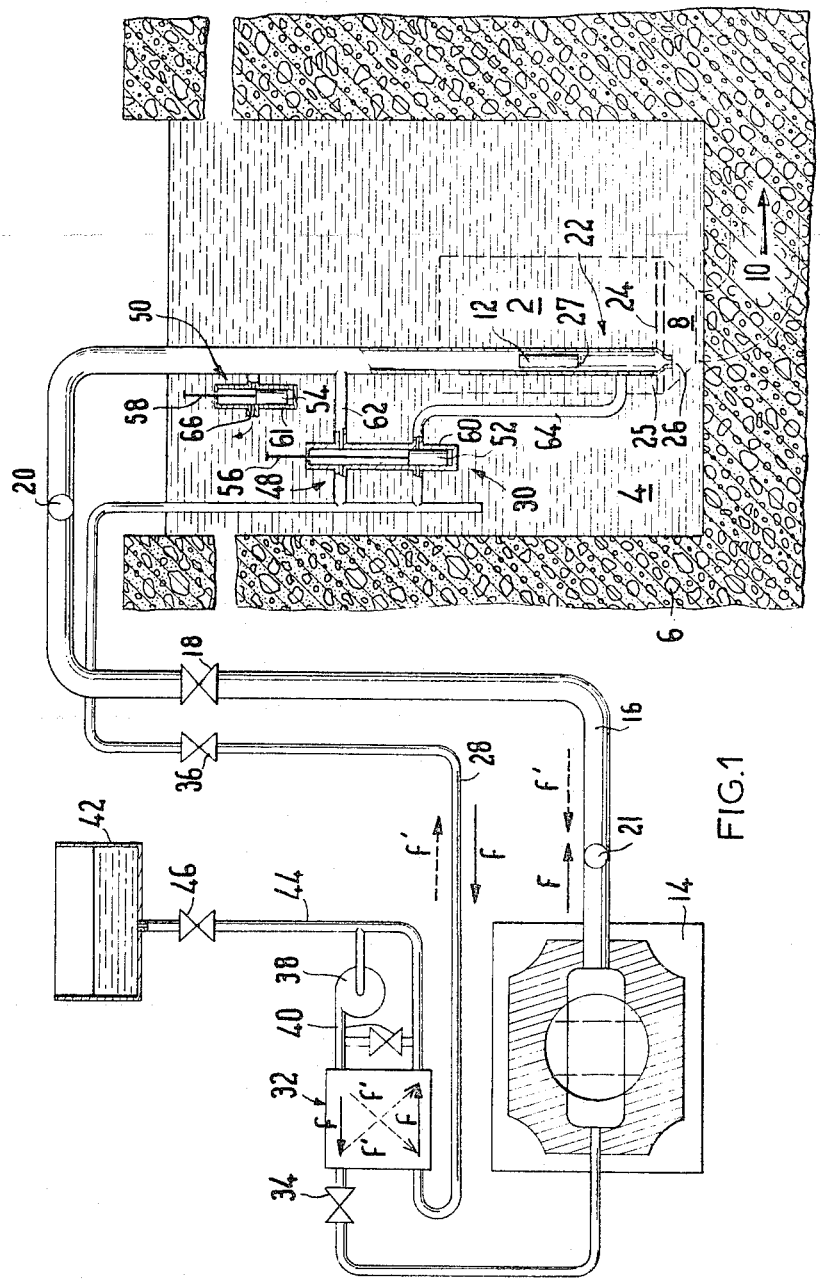
FIG. 1 is a general diagram of a hydraulic transfer facility, the component parts being shown in the position which they occupy during irradiation or in the inoperative position.

to the presence of a irradiation containers between the charge station and the point at which the fuel element passes in front of the last controller of the transit tube in the course of transfer of said irradiation containers to the irradiation station;

to the arrival of a irradiation containers in the irradiation position;

to the presence of a irradiation containers between the irradiation station and the distributor in the course of transfer of said irradiation containers to the charge and discharge station;

FIG. 5 shows that portion of the hydraulic facility which is located within the pool.

FIG. 1 shows diagrammatically the essential elements of a nuclear reactor of the swimming-pool type wherein the reactor core 2 as represented by broken lines is disposed close to the bottom of a body of water 4 which is enclosed within a vessel 6. The cooling of the core is effected by circulation of water through this latter so that the water which is derived from the body of water 4 is drawn down through the core via a cooling and de-activation system of which only the admission funnel 8 and the inlet section of the suction duct 10 have been diagrammatically illustrated in broken lines. This arrangement is conventional and therefore does not need to be described in detail.

The hydraulic facility in accordance with the invention is intended for the purpose of transporting an irradiation container 12 between an irradiation station which is located within the reactor core or in proximity to this latter and a charge and discharge tank 14.

The said facility comprises a transit tube 16 fitted with an electrovalve 18 which is closed at all times except during those periods in which it is energized, a switching controller 20 which is disposed between the electrovalve and the reactor core, a second controller 21 at the inlet of the tank 14 and a series of fuel element locating contacts (which have not been shown in the drawings). The terminal section of the transit tube 16 which constitutes the irradiation station 22 is provided with a base 25 which is adapted to fit in the bottom support grid 24 of the reactor core in the same manner as the ends of the fuel elements. There is formed in this base a narrow opening 26 which opens into the funnel 8.

The positioning of the irradiation container 12 to be irradiated is carried out by means of a seating 27 which is provided at a suitable height within the base 25 and against which the fuel element is intended to be applied. In order to permit the circulation of water within the tube when the irradiation container is in position, a series of apertures must be formed in the seating or, alternatively, the shape of the irradiation container must be so designed as to provide a leakage path between said element and the seating. The irradiation containers can, for example, be provided with support ribs or fins so as to provide passages for the circulation of water.

The hydraulic transfer facility further consists of a circulating tube 28 disposed along a path which is similar to that of the transit tube 16. The in-pile end of the tube 28 can be connected to either one or the other of the two ends of the irradiation station 22 through a distributor which is generally designated by the reference numeral 30 and which will be described hereinafter. In the tube 28 are interposed a reversing valve 32, an electrovalve 34 which is placed in that section of the tube which connects said reversing valve 32 to the charge tank 14 and an electrovalve 36 which is placed in that section of the tube which connects the reversing valve 32 to the distributor 30.

The reversing valve 32 is designed for the purpose of branching onto the circulating tube 28 an electropump set 38 fitted with a by-pass which can be either opened or closed by means of an electrovalve 40. The reversing valve 32 serves to establish between the electropump set 38 and the circulating tube 28 two different connections as represented diagrammatically in one case by the arrows f in full lines of the reversing valve 32 and in the other case by the arrows f' in broken lines (FIG. 1). In the first case, the pump causes the water to circulate within the transit tube of the tank 14 towards the reactor core and in the second case causes the water to circulate in the opposite direction.

The facility in accordance with the invention further comprises a reservoir-tank 42 for the supply of demineralized water which is preferably located at a higher level than that of the pump 38 which is connected to the suction side of the pump by means of a pipe 44 which is fitted with an electrovalve 46.

The distributor 30 is placed at a sufficient distance above the reactor core, three meters for example, for the purpose of ensuring partial biological shielding against the radiation which is emitted.

The distributor 30 consists of a casing which is placed at a level higher than that of the reactor core and which is fitted with two units 48 and 50 for checking the connections between the tubes 16 and 28 and the reactor tank. In the form of embodiment described, the aforesaid units consist of plungers 52 and 54, the displacements of which within bores 60 and 61 of the casing are controlled by any suitable means from the control desk. For example, the said plungers can be actuated as a result of a change in hydraulic pressure within the compartments which are limited by the end faces of said plungers and the end faces of said bores. Link-rods 56 and 58 which are coupled to the plungers serve to locate the positions of these latter within the reactor tank and if necessary to operate said plungers by hand in the event of breakdown.

The unit 48 is interposed in the path of a first connector-pipe 62 which provides a communication between the circulating tube 28 and a point of the transit tube 16 which is located above the irradiation station 22 and which can be considered as the upper extremity of said station. The said unit is also interposed in the path of a second connector-pipe 64 which also provides a communication between the circulating tube 28 and the lower extremity of the irradiation station 22.

When the plunger 52 takes up the bottom position in which it is shown in FIGS. 1 and 2, it closes off the tube 64 and opens the tube 62. On the contrary, when said plunger occupies the top position in which it is shown in FIGS. 3 and 4, it accordingly closes off the tube 62 and frees the tube 64.

The unit 50 is in its turn interposed in a pipe 66 which provides a communication between the body of water of the pool above the core and a point of the transit tube which is located above the point at which the pipe 62 opens into the tube 16; in the top position (as shown in FIGS. 2 and 3), the plunger 54 shuts off the pipe 66; in the bottom position (as shown in FIGS. 1 and 4), said plunger frees said pipe.

That portion of the tubing and piping system which is located within the pool can advantageously be fabricated of a light alloy whilst that portion which is located externally thereof can be formed of a plastic material such as polyvinyl chloride. As shown in FIG. 5, these tubes can be made up of a number of sections which are joined together by connectors. The major part of the tubing which is located externally of the reactor tank is arranged in troughing; and electrovalves of suitable design are provided at the necessary locations in order to permit the isolation of certain sections for maintenance and repair purposes. The transit tube 16 must of course not comprise any elbowed sections which have too short a radius of curvature which would be liable to arrest the progress of the fuel element.

The internal diameter of the circulating tube can of course be distinctly smaller than that of the transit tube; the respective dimensions are, for example, 56 and 32 millimeters in a facility which is at present in service as designed for the purpose of transferring irradiation containers having low potential activity at a speed of the order of 1.5 meters per second.

The distributor casing can also be formed of polyvinyl chloride whilst the plungers and link-rods are of light alloy.

The charge tank which is illustrated consists of a vessel filled with water containing a plug valve and constructed of nickel steel, for example, which performs the function of a loading box. The valve branches or passageways are connected to the transit tube 16 and to the circulating tube 28.

The operation of the device in the inoperative condition, during normal irradiation and during operations involving the transfer of an irradiation container will now be described.

When the system is in the inoperative condition, the components occupy the position shown in FIG. 1. The safety electrovalves 18 and 36 are closed. The electropump set 38 is stopped. The circulation system 10 draws water from the pool through the pipe 66 and the irradiation station 22.

In order to put the facility into service for the purpose of transferring an irradiation container from the charge tank 14 in which it has previously been placed to the irradiation station 22, it is first necessary to put into operation that section of the facility which is located on the upstream side of the safety electrovalves 36 and 18. This operation is carried out as a rule by inserting an "operation permitted" key in the control desk. The insertion of the key, which is preferably prevented by means of a safety interlock as long as the plug valve of the tank 14 is not closed (FIG. 1), initiates the opening of the safety electrovalves 36 and 18, the lighting-up of the indicating lamps and, after manual release, a sequence of automatic operations which are continued until a steady state is achieved which corresponds to irradiation. Provision can also be made for an individual manual control of the different elements in order to permit the possibility of testing these latter.

Prior to initiation of the automatic transfer of an irradiation container from the tank 14 to the irradiation station 22, the plungers 52 and 54 occupy the position in which they are shown in FIG. 1. The action produced on the "start" push-button initiates the operation of the electropump, causes the plunger 54 to move to its top position, maintains the plunger 52 in the bottom position thereof and opens the electrovalve 34 whilst the electrovalve 46 remains closed (FIG. 2). The water then circulates in the direction of the arrows shown in FIG. 2 through the loop which comprises the electropump 38, the reversing valve 32, the charge tank 14 and the circulating tube 28. A series of contacts placed in sequence on the tube 16 light up visual indicators on a synoptic table placed on the control desk, progressively as the irradiation container 12 which is impelled by the circulating current of liquid accordingly moves forward.

The arrival of the irradiation container at the level of the controller 20 initiates a sequence of operations.

First, the electrovalves 40 and 46 open and the plunger 52 takes up the top position in which it is shown in FIG. 3. The opening of the electrovalve 40 puts into hydraulic short-circuit the electropump set 38 and slows down the forward motion of the irradiation container. The circulating water which is driven back by the irradiation container is sucked into the funnel 8 through the aperture 26 of the centering base. The resulting losses are limited by the low discharge rate which results from the small diameter of the aperture 26 and are compensated by the supply of water from the feed-tank 42. The water accordingly circulates in the direction of the arrows which are indicated in FIG. 3.

When the irradiation container reaches its seating at the end of travel, there takes place a throttling of the flow of water and a correlative increase in pressure upstream of the irradiation container. A pressure detector which has not been shown in the drawings detects this variation and initiates the stoppage of the pump 38, causes the plunger 54 to move to the bottom position thereof and produces the closure of the electrovalve 46. The said pressure detector is also designed to initiate the lighting-up of visual indicators for the condition designated as "irradiation station in service." From this moment, the circulation of water takes place in the same manner as in the inoperative condition of the facility (as shown in FIG. 1). Accordingly, the water which is drawn through the tube 66 flows along the walls of the irradiation container 12 and passes into the circulation system 10 in which it is cooled and deactivated prior to returning into the reactor tank.

The foregoing description serves to bring out the fact that the water which has been circulated through the irradiation station 22 is not at any time during the transfer of the irradiation container 12 returned to that portion of the facility which is located outside the reactor tank.

The return of the irradiation container to the tank is carried out in the reverse order to that of the operation previously performed and is initiated automatically as a result of action produced on a "return" push-button. This push-button produces the change-over of the reversing valve 32 (in which the circulation accordingly takes place from that time in the direction of the arrows f' of FIG. 1), the closure of the electrovalve 34, the opening of the electrovalve 46, the return of the plunger 52 to the top position (whilst the plunger 54 remains in the bottom position), and the starting of the electropump 38. The components take up the position shown in FIG. 4 and a circulation is established in the direction indicated by the arrows in this figure. The water flows from the tank 42 towards the pool via the electrovalve 46, the pipe 44, the electropump 38, the reversing valve 32, the tube 28, the pipe 64, the irradiation station 22 and the tube 66. The upflowing circulation of water through the irradiation station 22 causes the irradiation container to move upwards to the opening of the tube 66 which is located at a substantial distance above the reactor core.

Once the irradiation container has reached the level of the opening of the pipe 66 within the transit tube 16, said container then comes to a standstill and an increase in pressure resulting from the throttling of the circulation system accordingly takes place upstream of the irradiation container. A pressure detector (which has not been shown in the drawings) then initiates, after a time-delay of suitable duration, a sequence of operations for returning the irradiation container from this location to the tank 14. The time-delay, which has a duration of the order of 10 seconds, for example, is intended to have the effect of washing the irradiation container and of preventing the entrainment of activated water. Once this time-delay has expired, the detector initiates the opening of the electrovalve 34, causes the plunger 52 to move into its bottom position and the piston 54 to move into its top position, and initiates the closure of the electrovalves 40 and 46. The circulation of water then takes place through the loop which consists of elements located externally of the pool, the tubes 16 and 28 and the pipe 62 which opens into the tube 16 below the irradiated irradiation container when this latter is located at the level of the pipe 66. The irradiation container is then impelled by the circulating current of water and the indicator lamps are extinguished progressively as the irradiation container advances through the system, thereby locating its passage.

Finally, the passage of the irradiation container at the level of the controller 21 which is disposed at the inlet of the charge tank 14 initiates the opening of the electrovalves 40 and 46 so as to brake the motion of the irradiation container. The arrival of said fuel element within the plug valve produces a sudden pressure rise which is detected by a pressure detector which restores the entire facility to the inoperative position.

The foregoing description shows in addition that, at no time during the return of the irradiation container 12 from the irradiation station to the charge station does the water which is contaminated as a result of its passage through the irradiation station return to that portion of the facility which is located externally of the pool. During the first stage of transfer (displacement of the irradiation container from the irradiation station up to the level of the pipe 66) the small quantity of water which has passed through the irradiation station flows into the pool through the pipe 66 and the compensation of losses is effected from the reservoir-tank. During the second stage of transfer (displacement of the irradiation container from the tube 66 to the charge tank) the circulation of water takes place within a loop which short-circuits the irradiation station.

The operational sequences which have been described above correspond to an automatic operation. The actuation of the different electrovalves and of the electropump set for the purpose of carrying out individual tests can also be controlled by means of push-buttons located on the control desk. However, interlocks prevent the operations which could initiate the arrival of activated water in that portion of the facility which is located externally of the pool; the said interlocks prevent the manual testing of the electropump 54 if the electropump is rotating (danger of returning activated water) and associate the manual test of the electrovalve 46 with that of the electrovalve 40 (limitation of the flow from the reservoir-tank which contains demineralized water).

It will be apparent that this invention is not limited solely to that form of embodiment which has been illustrated and described and that this patent extends to any alternative form of either all or a part of the arrangements described which may be considered as coming within the definition of equivalent technical means.

What we claim is:

1. Facility for the hydraulic transfer of irradiation containers between an irradiation station located within a body of water and a charge and discharge station located externally of said body of water, comprising a transit tube for transferring irradiation containers and connecting said charge station to a first extremity of said irradiation station, a circulating tube permanently connected to said charge station, a distributor providing communication between said first extremity of said irradiation station and said body of water and for isolating said first extremity from said body of water and for connecting said circulating tube to either extremity of said irradiation station, a circulating pump for causing water to circulate in either direction within said circulating tube and a compensating reservoir-tank supplying said tubes with a quantity of purified water which corresponds to said quantity delivered from said body of water through said distributor into said transit tube.

2. Hydraulic transfer facility in accordance with claim 1, wherein said distributor comprises a conduit connecting said first extremity of said irradiation station to said body of water, a closure device fitted in said conduit, two conduits respectively connecting said circulating tube to one and to the other of the extremities of said irradiation station and a selector member moving between two positions each corresponding to the closure of one of said conduits.

3. Hydraulic transfer facility in accordance with claim 2, wherein said conduit which connects the extremity of said irradiation station to said circulating tube opens into said transit tube at an intermediate point between said irradiation station and said conduit which connects said extremity and said body of water.

4. Hydraulic transfer facility in accordance with claim 1 wherein said irradiation station is disposed adjacent the core of a swimming-pool reactor and wherein, under normal operating conditions, the core cooling system produces a suction of water via said irradiation station for the removal of heat dissipated by the irradiated container.

References Cited by the Examiner
UNITED STATES PATENTS

| | | | |
|---|---|---|---|
| 2,926,127 | 2/1960 | McCorkle | 176—63 |
| 3,093,562 | 6/1963 | Zinn | 176—63 |
| 3,136,697 | 6/1964 | Arnold et al. | 176—32 X |

FOREIGN PATENTS

| | | |
|---|---|---|
| 1,276,165 | 10/1961 | France. |
| 1,276,293 | 10/1961 | France. |
| 908,130 | 10/1962 | Great Britain. |

L. DEWAYNE RUTLEDGE, *Primary Examiner.*